US012695930B2

(12) United States Patent
Doken et al.

(10) Patent No.: US 12,695,930 B2
(45) Date of Patent: Jul. 28, 2026

(54) SYSTEMS AND METHODS FOR MANAGING STREAMING RESOURCE CONSUMPTION

(71) Applicant: Adeia Guides Inc., San Jose, CA (US)

(72) Inventors: Serhad Doken, Bryn Mawr, PA (US);
Tao Chen, Palo Alto, CA (US);
Charles Dasher, Lawrenceville, GA (US); Ning Xu, Irvine, CA (US);
Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 134 days.

(21) Appl. No.: 18/540,089

(22) Filed: Dec. 14, 2023

(65) Prior Publication Data

US 2025/0203138 A1      Jun. 19, 2025

(51) Int. Cl.
*H04N 21/24* (2011.01)
*H04N 21/431* (2011.01)
*H04N 21/466* (2011.01)

(52) U.S. Cl.
CPC ..... *H04N 21/2402* (2013.01); *H04N 21/4316* (2013.01); *H04N 21/4668* (2013.01)

(58) Field of Classification Search
None
See application file for complete search history.

(56) References Cited

U.S. PATENT DOCUMENTS

| | | | | |
|---|---|---|---|---|
| 10,582,372 | B2 * | 3/2020 | Muñoz | H04W 76/10 |
| 2022/0188698 | A1 * | 6/2022 | Halecky | G06Q 30/0613 |

| | | | | |
|---|---|---|---|---|
| 2023/0232052 | A1 * | 7/2023 | Khavronin | H04N 21/251 |
| | | | | 709/219 |
| 2024/0073219 | A1 * | 2/2024 | Maizels | G06V 40/174 |
| 2024/0187695 | A1 * | 6/2024 | Docherty | H04N 21/4661 |

OTHER PUBLICATIONS

Pattanayak et al., "Review of Recommender System for OTT platform through Artificial Intelligence", Sep. 3, 2021, IEEE, 2021 9th International Conference on Reliability, Infocom Technologies and Optimization (Trends and Future Directions) (ICRITO) (2021, pp. 1-5) (Year: 2021).*

(Continued)

*Primary Examiner* — Davoud A Zand
(74) *Attorney, Agent, or Firm* — HG LAW LLP

(57) ABSTRACT

Systems and methods are provided for utilizing historic user consumption of media assets to manage the resources associated with streaming further media asset. tracking, at a computing device, A consumption of a plurality of media assets within a preset time period are tracked at a computing device, and a first resource value associated with the plurality of media assets is identified. A consumption velocity associated with the consumption of the plurality of media assets is identified, and the consumption velocity is weighted based on the first resource value. It is determined that the weighted consumption velocity is above a threshold consumption velocity, and a user interface element comprising a recommendation for a media asset is generated for output, wherein a second resource value associated with the recommended media asset is lower than the first resource value.

20 Claims, 11 Drawing Sheets

(56)         References Cited

OTHER PUBLICATIONS

Adgate, Brad , "Nielsen: How The Pandemic Changed at Home Media Consumption", Adgate, "Nielsen: How the Pandemic Changed at Home Media Consumption", Forbes Aug. 21, 2020, Retrieved from https://www.forbes.com/sites/bradadgate/2020/08/21/nielsen-how-the-pandemic-changed-at-home-media-consumption/?sh= 2087c5095a28 (7 Pages).

Shapiro, Doug , "To Everything, Churn, Churn, Churn How Churn Became Streaming TV's Biggest Surprise and Biggest Problem", Shapiro, "To Everything, Churn, Churn, Churn How Churn Became Streaming TV's Biggest Surprise and Biggest Problem", Medium Nov. 17, 2022, Retrieved from https://dougshapiro.medium.com/to-everything-churn-churn-churn-b9044d376be (37 Pages).

Starosta, Jolanta A., et al., "Understanding the Phenomenon of Binge-Watching—A Systematic Review", Starosta, et al. "Understanding the Phenomenon of Binge-Watching—A Systematic Review" PMC Jun. 21, 2020, Retrieved from Understanding the Phenomenon of Binge-Watching—A Systematic Review (19 Pages).

Stearmingmedia , "Survey Says: OTT Churn Rate at All-Time High", StearmingMedia, "Survey Says: OTT Churn Rate at All-Time High" (2022) Retrieved Apr. 29, 2022, from https://www.streamingmedia.com/Articles/ReadArticle.aspx?ArticleID=152528 (5 Pages).

Wikipedia , "Binge-watching", Wikipedia, "Binge-watching" Retrieved from https://en.wikipedia. org/wiki/Binge-watching (11 Pages).

* cited by examiner

408

402

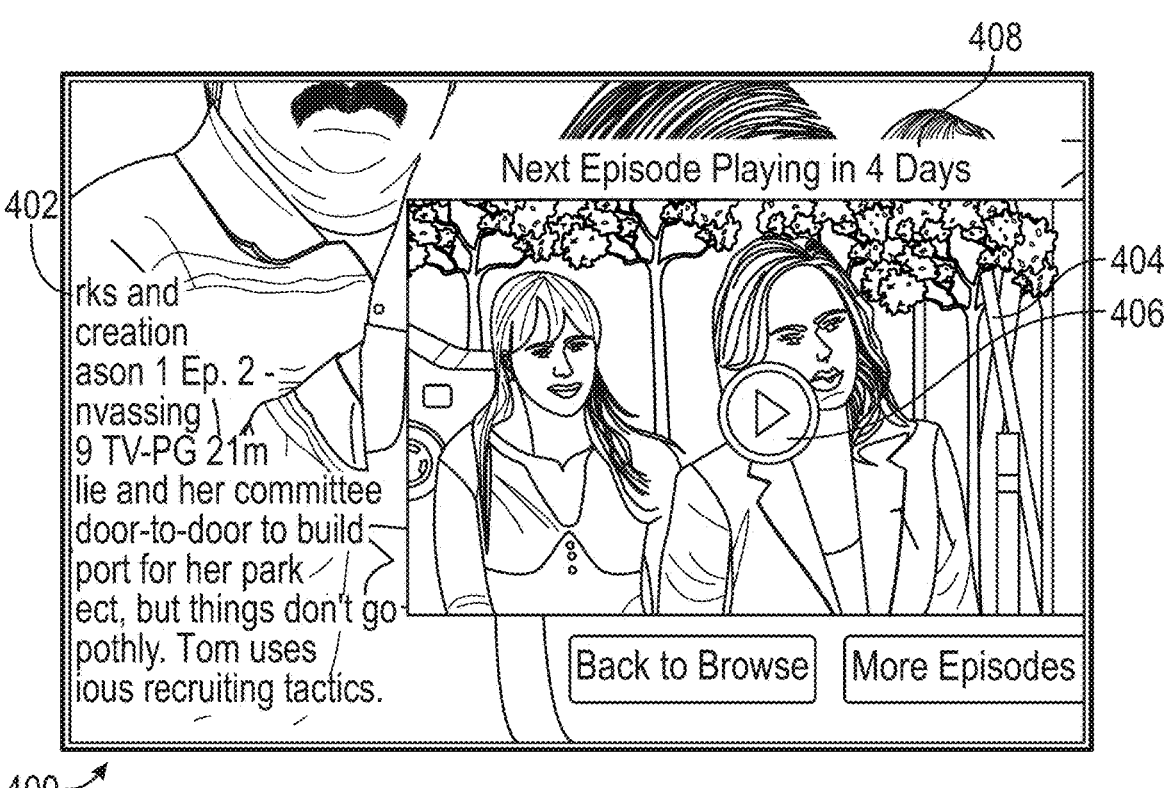

Next Episode Playing in 4 Days rks and
creation
ason 1 Ep. 2 -
nvassing
9 TV-PG 21m
lie and her committee
door-to-door to build
port for her park
ect, but things don't go
pothly. Tom uses
ious recruiting tactics.

404
406

Back to Browse          More Episodes

Next Episode Playing in 480p rks and
creation
ason 1 Ep. 2 -
nvassing
9 TV-PG 21m
lie and her committee
door-to-door to build
port for her park
ect, but things don't go
pothly. Tom uses
ious recruiting tactics.

504
506

Back to Browse          More Episodes

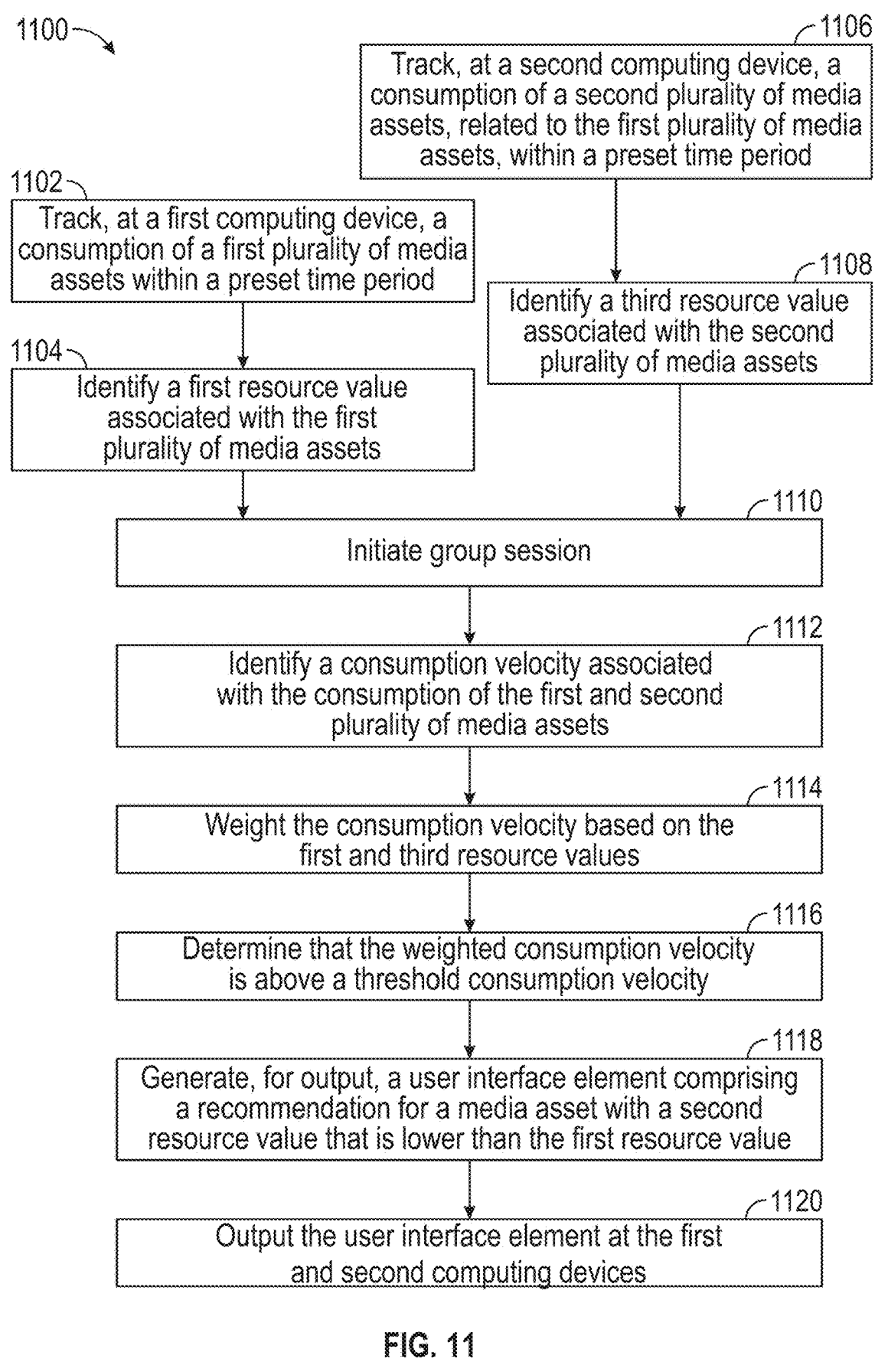

1106
Track, at a second computing device, a consumption of a second plurality of media assets, related to the first plurality of media assets, within a preset time period 1102
Track, at a first computing device, a consumption of a first plurality of media assets within a preset time period 1108
Identify a third resource value associated with the second plurality of media assets 1104
Identify a first resource value associated with the first plurality of media assets 1110
Initiate group session 1112
Identify a consumption velocity associated with the consumption of the first and second plurality of media assets 1114
Weight the consumption velocity based on the first and third resource values 1116
Determine that the weighted consumption velocity is above a threshold consumption velocity 1118
Generate, for output, a user interface element comprising a recommendation for a media asset with a second resource value that is lower than the first resource value 1120
Output the user interface element at the first and second computing devices

FIG. 11

SYSTEMS AND METHODS FOR MANAGING STREAMING RESOURCE CONSUMPTION

FIELD OF THE DISCLOSURE

One or more disclosed embodiments are directed towards systems and methods for utilizing historic user consumption of media assets to manage the resources associated with streaming further media assets.

SUMMARY

With the widespread availability of over-the-top (OTT) streaming platforms, such as Netflix®, Disney+®, Hulu® and Amazon Prime® Video, the consumption of media assets via the internet is becoming increasingly popular. However, the bandwidth available to stream media assets from servers where the media assets are stored to end users is limited, and some users may utilize a disproportionate amount of that available bandwidth. Where the media assets are a series of episodes, some users may stream many episodes, one after the other, in a relatively short time period. For instance, some users may stream episodes back-to-back in a session that is substantially the same length as the cumulative length of the streamed episodes. This is sometimes referred to as a binge session or, more generally, binge watching. Over time, users who consistently binge episodes utilize a relatively large amount of the available bandwidth when compared to users who do not binge episodes, which can make resource management, such as bandwidth and/or cache management, challenging and may reduce the efficiency with which streaming platforms can deliver media asset data to end users. Not only do these users utilize a relatively large proportion of bandwidth available for all users, they may also utilize a relatively large proportion of processing power of the servers that are used to manage the delivery of media assets to end users. This may be a particular issue, e.g., when a new season (or series) of episodes is just launched and there is a massive rush of users who are attempting to access the episodes at the same time (e.g., after dinner), overwhelming a limited amount of bandwidth. In order to, e.g., reduce the excess resources associated with managing users who utilize a relatively large amount of limited bandwidth and processing power, there is a need to improve server, and/or edge, efficiency by securing OTT platforms against users who utilize a relatively large amount of bandwidth and other resources.

Some approaches may include hosting media assets at intermediary or edge servers. For instance, rather than each user of the OTT platform accessing a newly released program directly from an origin server, groups of subscribers may access the new program stored, e.g., at an edge server that may be geographically closer to their watching location. This is still insufficient as, for instance, binge watchers hogging bandwidth and resources may be unevenly distributed geographically and still overtax the edge servers. In fact, the edge server and the corresponding network connections may have smaller capacity than, e.g., a central server, and be ill equipped for increased streaming demands of several simultaneous binge watchers focused on the program(s). Whether it is the content servers are central, intermediary, or at the edge, there can be issues of straining bandwidth and resources by binge-watching users.

To help address these problems, systems and methods are provided for utilizing historic user consumption of media assets to manage the resources associated with streaming further media assets.

In accordance with some aspects of the disclosure, a method is provided. A consumption of a plurality of media assets within a preset time period is tracked at a computing device, and a first resource value associated with the plurality of media assets is identified. A consumption velocity associated with the consumption of the plurality of media assets is also identified, and the consumption velocity is weighted based on the first resource value. It is determined that the weighted consumption velocity is above a threshold consumption velocity, and a user interface element comprising a recommendation for a media asset is generated for output, where a second resource value associated with the recommended media asset is lower than the first resource value.

In an example system, a user accesses an OTT platform, such as Disney+, via a user account and profile and starts consuming a series of episodes, such as a series of "Loki," at a smart television. In this example, the user consumes a plurality of episodes of Loki back-to-back, such that the amount of time that the smart television displays the Loki episodes substantially corresponds to the duration of the episodes (i.e., a relatively high consumption velocity). The Disney+ OTT platform tracks the time period in which the media assets are output to determine the consumption velocity, and also determines that a relatively high bandwidth usage is associated with the consumption of the episodes of Loki. This high bandwidth usage may be based on an individual usage, such as a cumulative individual usage, or, in other examples, due to a relatively large number of people consuming the episodes of Loki at a similar time, for example, if the program has recently been released. In this example, the relatively high bandwidth usage increases the weight of the relatively high consumption velocity to give a higher value for the weighted consumption velocity, such that it exceeds a threshold. In response to the threshold being exceeded, in this example, a recommendation is generated for display at the smart television, for example, for the program "Welcome to Wrexham" that, in this example, has a lower bandwidth value associated with it. The lower bandwidth usage may be based on an individual usage, such as a cumulative individual usage, or, in other examples, due to a relatively small number of people consuming the episodes of Welcome to Wrexham at a similar time, for example, if the program has been available for a relatively long time period. In some examples, the recommendation may comprise a selectable element that enables a user to view an episode of Welcome to Wrexham.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 4 shows another example user interface for managing the resources associated with streaming further media assets, in accordance with some embodiments of the disclosure;

FIG. 5 shows another example user interface for managing the resources associated with streaming further media assets, in accordance with some embodiments of the disclosure;

Figure 10A:
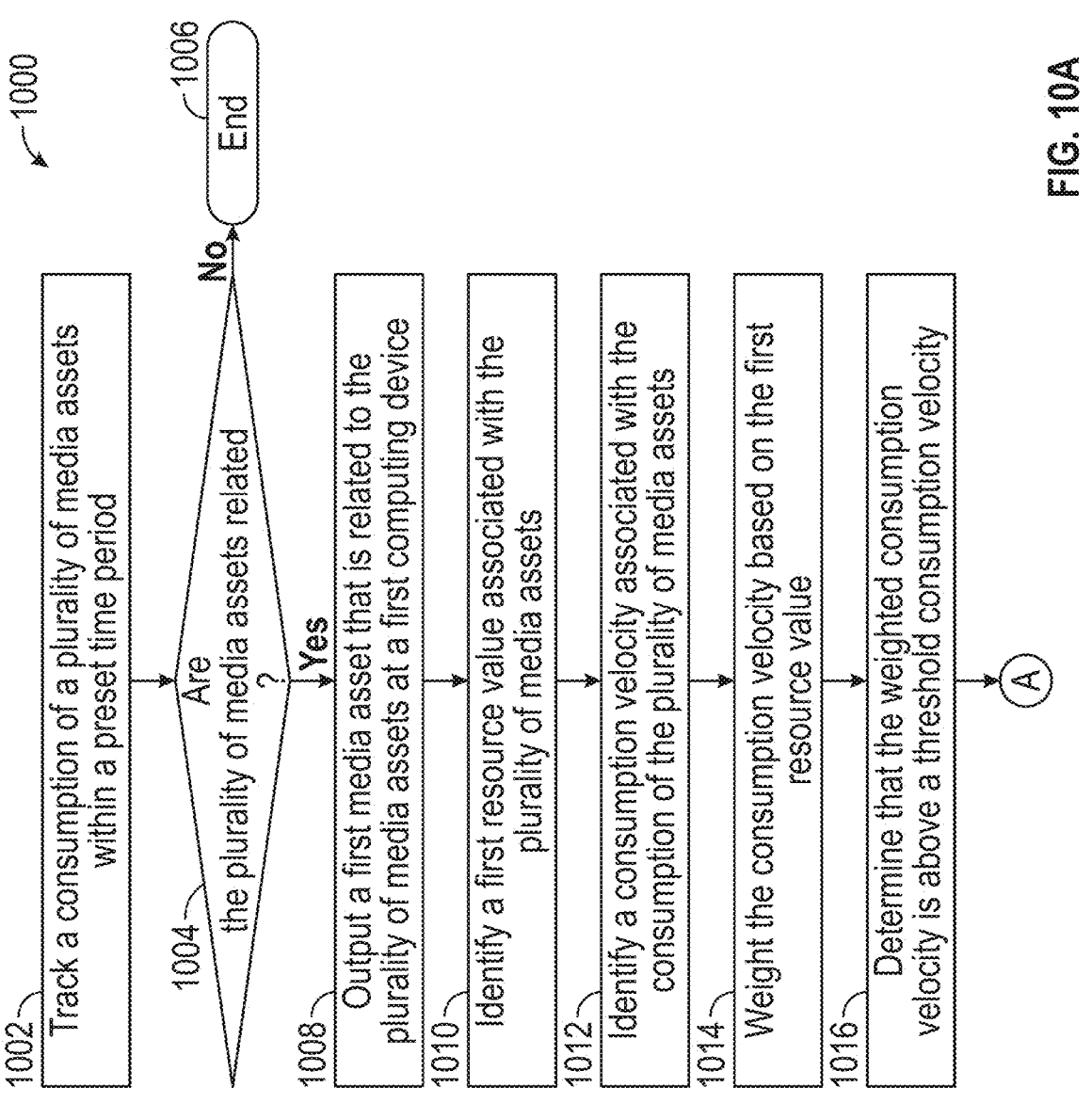
Figure 10B:
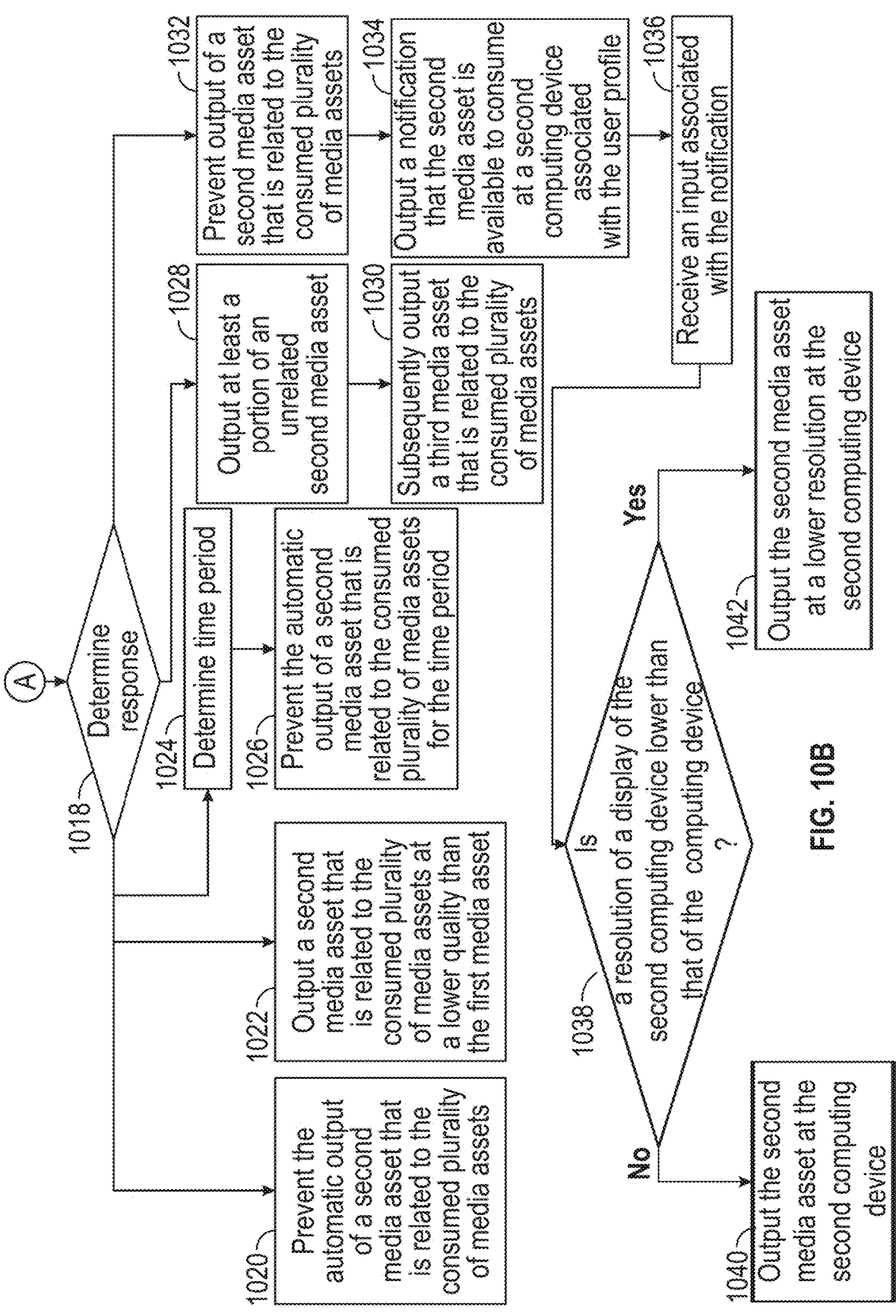

FIGS. 10A-10B show flowcharts of illustrative steps for enabling an environment for utilizing historic user consumption of media assets to manage the resources associated with streaming further media assets, in accordance with some embodiments of the disclosure; and FIG. 11 shows another flowchart of illustrative steps for enabling an environment for utilizing historic user consumption of media assets to manage the resources associated with streaming further media assets, in accordance with some embodiments of the disclosure.

DETAILED DESCRIPTION

A media asset includes an image, a picture, audio, video, text, a video game and/or any other media asset. A media asset may be a single media asset. In other examples, it may be a series (or season) of episodes of content items, i.e., the media assets may be related. Video includes audiovisual content such as movies and/or television programs. Audio includes audio-only content, such as podcasts. Text includes text-only content, such as event descriptions. One example of a suitable media content item is one that complies with the MPEG DASH standard. An OTT, streaming and/or video-on-demand service (or platform) may be accessed via a website and/or an app running on a computing device, and the device may receive any type of content item, including live content items and/or on-demand content items. Media assets may, for example, be streamed to physical computing devices. In another example, media assets may, for example, be streamed to virtual computing devices in, for example, an augmented environment, a virtual environment and/or the metaverse.

The disclosed methods and systems may be implemented on one or more computing devices, such as user devices. As referred to herein, a computing device can be any device comprising a processor and memory including, for example, a handheld computer, a mobile telephone, a portable video player, a portable music player, a portable gaming machine, a smart television, a tablet device, a smartphone, a smartwatch, a smart speaker, an augmented reality headset, a mixed reality device, a virtual reality device, a gaming console, or any other computing equipment, wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media cards, register memory, processor caches, random access memory (RAM) and/or a solid-state drive.

Figure 1:
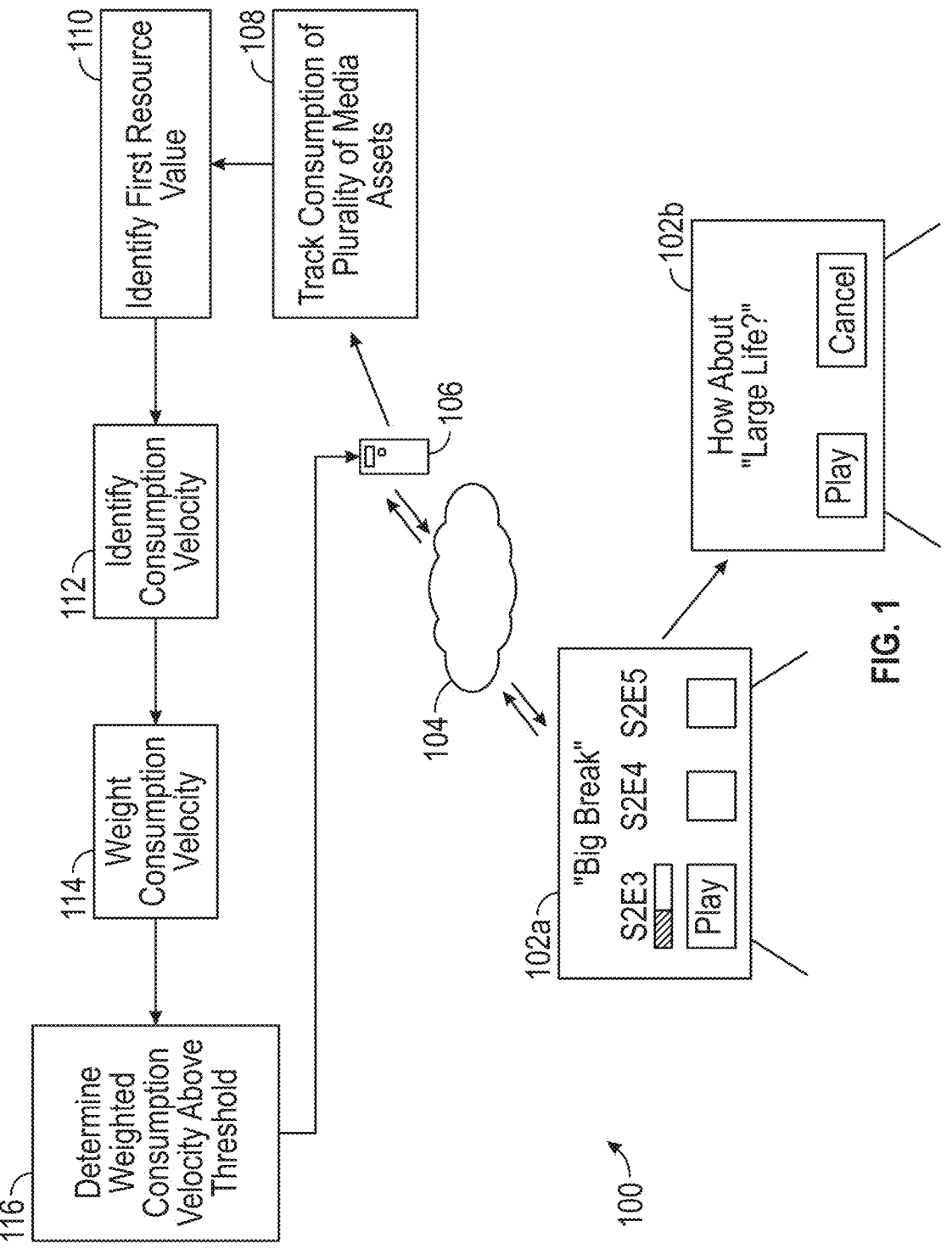
FIG. 1 shows an example environment for utilizing historic user consumption of media assets to manage the resources associated with streaming further media assets, in accordance with some embodiments of the disclosure.

FIG. 1 shows an example environment for utilizing historic user consumption of media assets to manage the resources associated with streaming further media assets, in accordance with some embodiments of the disclosure. In this example, the environment 100 comprises a computing device 102, such as a smart television, a network 104 and a server 106. The computing device 102 is referred to as computing device 102*a* at a first time point, and as computing device 102*b* at a second time point. A user consumes media assets, for example at the computing device 102*a*, and an indication of the consumed media assets is transmitted from the computing device 102, via network 104, to the server 106. The network 104 may be any suitable network, such as the internet, and may comprise wired and wireless means.

At the server 106, at 108, the consumption of the plurality of media assets within a preset time period is tracked, for example, the consumption of the plurality of media assets within a day, a week and/or a month. At 110, a first resource value associated with the consumption of the plurality of media assets is identified. For example, the resource value may be based on a bandwidth consumption or storage usage associated with delivering the plurality of media assets to the computing device 102. In some examples, the storage usage may be volatile memory utilization. In other examples, the storage usage the storage usage may be non-volatile memory utilization. In a further examples, the storage usage may be associated with the utilization of one or more caching resources. In another example, the resource value may be based on a processing workload associated with delivering the plurality of media assets to the computing device 102. At 112, a consumption velocity associated with the consumption of the plurality of media assets is identified. For example, a consumption velocity may be the rate at which media assets are consumed during a particular time period or bounded time window. In some examples, the media assets may be related to each other, for example, the media assets may be different episodes of a series. Another example of assets being related to each other may be that the media assets are unique or exclusive to a given content provider or service, for example, Game of Thrones and House of the Dragon may be exclusive to HBO, and The Bear may be exclusive to Hulu. At 114, the consumption velocity is weighted based on the first resource value. For example, if a relatively large number of high-definition media assets are consumed, and this consumes a relatively large amount of bandwidth, then a high weighting may be applied to the consumption velocity. In another example, if a relatively large number of high-definition media assets are consumed, and this consumes a relatively small amount of bandwidth, then a low weighting may be applied to the consumption velocity. At 116, it is determined that the weighted consumption velocity is above a threshold consumption velocity. This may be a threshold that is defined compared to other users of a service, or OTT platform, for example, if the weighted consumption velocity is larger than 80% of the average weighted consumption velocity of all users of the service.

In response to determining that the weighted consumption velocity is above a threshold consumption velocity, a user interface element comprising a recommendation for a media asset is generated for output at the computing device 102, wherein a second resource value associated with the recommended media asset is lower than the first resource value. For example, media assets that are at a lower definition, or are of a shorter length, may be included as a recommendation. In some examples, this recommendation may be based on a user profile and a user's past viewing history. This generating of the user interface element may take place at the computing device 102, the server 106, or a combination of the two. The user interface element comprising the recommendation for the media asset is output at the smart television 102*b*. In this manner, the excess resources associated with managing users who utilize a relatively large amount of limited bandwidth and processing power may be reduced, thereby improving server, and/or edge computing, efficiency.

Although the components 108, 110, 112, 114, 116 are depicted in this example as taking place at the server 106, any one or more of the components may be carried out at the computing device 102 and/or multiple servers including physical and/or virtual servers.

In some examples, the consumption of a plurality of media assets, such as binge activity, may be calculated based on a user account, and/or based on a user profile that is created in a subscription account. A binge token value may be calculated for each consumed media asset. A binge token value may be proportional to the popularity of a particular media asset. In one example, popularity may be defined as a popularity in a specific time window, such as a number of hours associated with consuming a plurality of media assets. In another example, media assets that are licensed-in (for example, Disney content on the Netflix platform) may have higher binge token value as opposed to media assets produced by the platform itself.

Binge token values may come from several different categories, for example based on genre, such as a thriller genre. Binge token values for such media assets (i.e., of the identified genre) may be higher for a particular profile. Moreover, there is a time element to binge token values, as the popularity of media assets changes over time. The binge token value of such media assets may go down as their age increases. For example, a binge token value for the series "Squid Games" may be the highest during a September 2022 timeframe (i.e., when the series is launched on an OTT platform), and may have depreciated with respect to time. Another factor to compute the binge token value is the intensity of the binging activity with respect to a time domain.

A binge timing coefficient may be computed based on the interleaving of a media asset watch history with respect to time. For example, consuming all, or a subset, of the episodes of the media assets of the series "House of Cards" may result in a higher binge timing coefficient compared to consuming an episode each night or week. For example, consuming multiple episodes of House of Cards may cause the binge timing coefficient to have the value of two rather than one. In an example, if episodes 1 and 2 of House of Cards are consumed on a first day, and episode 3 is consumed a day later, a binge timing coefficient of one will be computed for the media assets associated with the series House of Cards. A binge counter may be calculated for a user profile. The binge counter may be computed for a set period of time, for instance every week, or for a sliding window, such as every seven days. The binge counter may be calculated as:

$$BC(\text{profile}) = \sum_{i=1}^{n} \sum_{tx=start\ time}^{end\ time} BTC(i,\ tx) * BV(i,\ tx)$$

where i is a media asset identification, tx is a time period, BC is the binge counter, BTC is the binge timing coefficient, and BV is a binge resource value.

Once a computed binge counter value is above a certain threshold for a set amount of time (for example, one week or multiple weeks), the binge counter is deemed to be an indicator of heavy binging by a user on a platform, such as an OTT platform. The binge counter may also be computed for all profiles associated with a subscription account (e.g., all profiles associated with a single payment account to an OTT platform, for example), in order to take into account binging different media assets, such as episodes, using different profiles under the same account. The algorithm to compute the binge counter may be prioritized and back-propagated for those accounts based on subscription history of canceling and/or restarting a subscription to a service, such as an OTT platform, as well as historical high values of a calculated binge counter. Since the binge counter computation is time based, a low-activity week after a high-activity week may bring down the value for the binge counter; however, sufficient variations of binge counter values prior to a cancellation, for example, of a subscription to an OTT service, may also contribute to a binge counter value.

Figure 2:
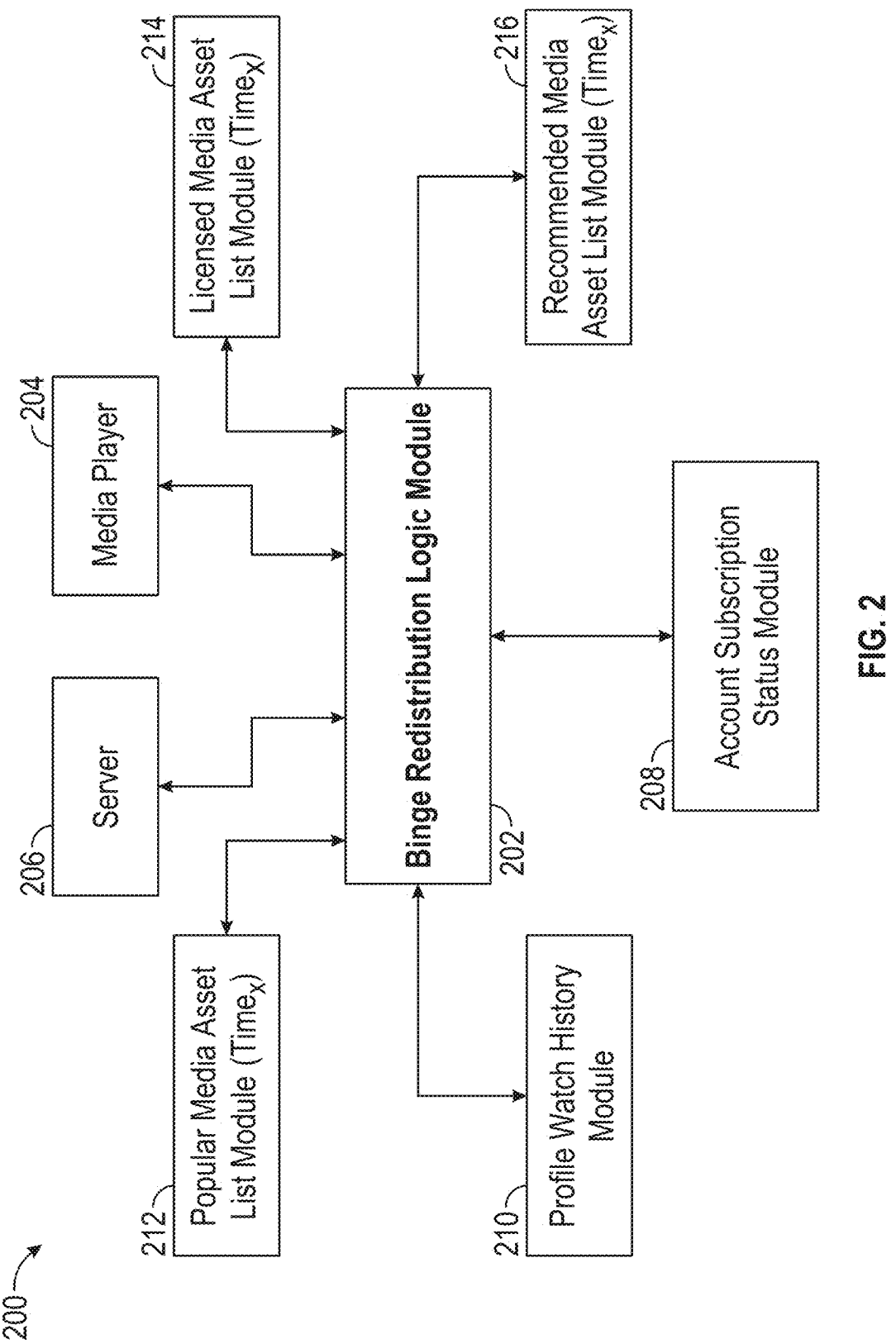
FIG. 2 shows a block diagram of components for enabling an environment for utilizing historic user consumption of media assets to manage the resources associated with streaming further media assets, in accordance with some embodiments of the disclosure.

FIG. 2 shows a block diagram of components for enabling an environment for utilizing historic user consumption of media assets to manage the resources associated with streaming further media assets, in accordance with some embodiments of the disclosure. The block diagram 200 comprises a binge redistribution logic module 202, a media player 204 running on a computing device and a server 206. The media player 204 and the server 206 are in communication with the binge redistribution logic module 202, which identifies if a weighted consumption velocity of a user is above a threshold consumption velocity. The binge redistribution logic module 202 receives input from an account subscription status module 208, a profile watch history module 210, a popular media asset list module 212, a licensed media asset list module 214 and a recommended media asset list module 216.

The account subscription status module 208 enables the binge redistribution logic module 202 to determine a subscription level of a user profile, which may be utilized to ensure that recommendations include only media assets that may be accessed via the user profile. The profile watch history module 210 enables the binge redistribution logic module 202 to determine the media assets that have been consumed and to identify a first resource value and a consumption velocity associated with the consumption of the media assets. The popular media asset list module 212 enables the binge redistribution logic module 202 to determine which media assets are popular within a time period, x, for determining a suitable recommendation. The licensed media asset list module 212 enables the binge redistribution logic module 202 to determine which media assets are licensed within a time period, x, again for determining a suitable recommendation. The recommended content list module 216 enables the binge redistribution logic module 202 to determine which media assets have been recommended for a user profile, and enables the binge redistribution logic module 202 to alter the recommendation based on second resource values associated with the recommended media assets over a time period, x.

In an example, once it is determined that an account and/or profile has exceeded a time-based binge limit, as computed by a binge counter for that time period (for example, a week), a service platform, such as an OTT platform, may start applying different ways to stagger the binge activity until the next time period (for example, the next week) and/or until the binge counter goes below a threshold. In some examples, a time-based binge limit may be tracked on an account level (i.e., an account associated with a household and/or payment method). An account may have a plurality of user profiles associated with it, for example, a profile created by members of a household. In other examples, the time-based binge limit may be tracked on a profile level. If the time-based binge limit is exceeded, media assets that were used to compute the binge counter score may be removed from a personalized recommended list on a service platform, such as an OTT platform. Other items with low binge value scores may be pushed up on the recommended list on the service platform. Low popularity items (i.e., with a low resource value associated with them), when watched may apply a negative value to the binge counter. This enables the platform to get more exposure to media items that are generally not consumed by subscribers. In another example, auto-play functionality of a media player for a next media asset of a currently consumed media asset (i.e., that is related) that is on, for example, a watch list, or playlist, comprising a series of episodes may be disabled.

Figure 3:
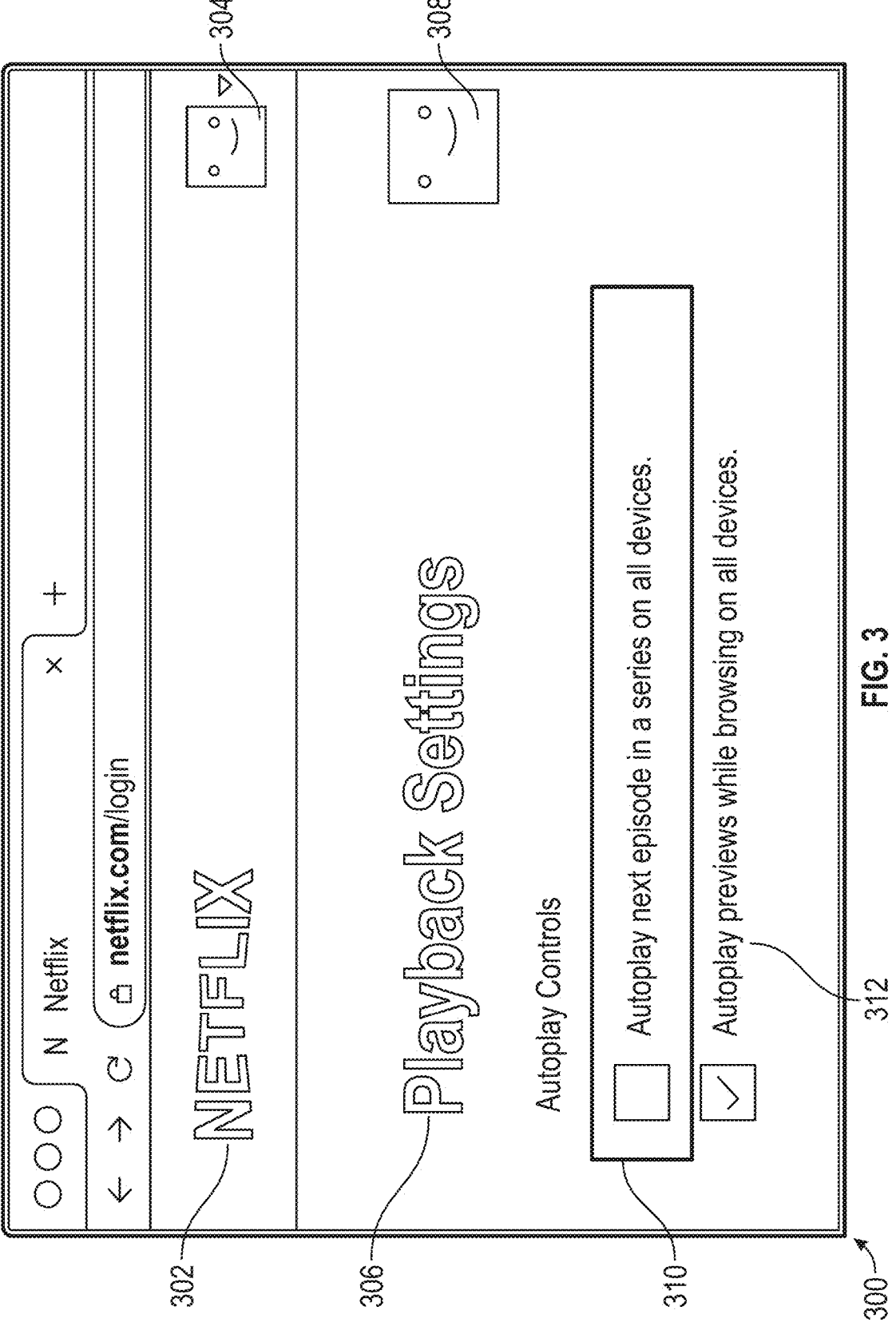
FIG. 3 shows an example user interface for managing the resources associated with streaming further media assets, in accordance with some embodiments of the disclosure.

FIG. 3 shows an example user interface for managing the resources associated with streaming further media assets, in accordance with some embodiments of the disclosure. The user interface 300 comprises an indication of an OTT platform provider 302, an indication of a selectable user profile 304, a playback settings interface 306, an indication 308 of the user profile to which the playback settings are applied, a first autoplay control selection 310 and a second autoplay control selection 312. In a default setting, a user may be able to select a first autoplay control selection 310, which enables the next episode in a series to be auto-played on all devices associated with the user profile 304, and a second autoplay control selection 312, which enables previews of media assets to be auto-played while browsing on all devices associated with the user profile 304. In an example, if it is determined that the weighted consumption velocity is above a threshold consumption velocity, then the first autoplay control selection 310 may not be selectable and/or may be hidden in the playback setting interface 306.

FIG. 4 shows another example user interface for managing the resources associated with streaming further media assets, in accordance with some embodiments of the disclosure. The user interface 400 comprises an interface 402 associated with a plurality of media assets, and a preview 404 of a subsequent media asset in a plurality of related media assets. The user interface 402 and/or the preview 404 may be displayed when a user selects a series in an electronic program guide, at the end of an episode of a series and/or near the end of an episode of a series (e.g., when credits for a media asset are being output). In a default setting, the next episode may autoplay, and/or playback of the next episode may be selectable via an icon, such as a play icon 406. In an example, if it is determined that the weighted consumption velocity is above a threshold consumption velocity, then playback of the next media asset in a plurality of related media assets may be delayed for a period of time, in this example, for four days, even if the media asset is available for consumption. Any suitable time period may be utilized including, for example, 30 minutes, one day, a week, a month, and/or after a trial period will expire. An indicator 408 of the time period of the delay may be generated for output.

FIG. 5 shows another example user interface for managing the resources associated with streaming further media assets, in accordance with some embodiments of the disclosure. The user interface 500 comprises an interface 502 associated with a plurality of media assets, and a preview 504 of a subsequent media asset in a plurality of related media assets. The user interface 502 and/or the preview 504 may be displayed when a user selects a series in an electronic program guide, at the end of an episode of a series and/or near the end of an episode of a series (e.g., when credits for a media asset are being output). In a default setting, the next episode may autoplay and/or playback of the next episode may be selectable via an icon, such as a play icon 506. In an example, if it is determined that the weighted consumption velocity is above a threshold consumption velocity, then playback of the next media asset in a plurality of related media assets may play at a reduced resolution or quality, in this example, at a resolution of 480p, even if the media asset is available in a higher resolution. Any suitable resolution may be utilized including, for example, 360p (standard definition), 720p (high definition), 1080p (full high definition), 1440p (2K) and/or 2160p (4K). The resolution may be limited based on the resolution of a current episode, for example, if a media asset is available at 8K, the resolution may be limited to 4K. In another example, if a media asset is available at 1080p, the resolution may be limited to 360p. An indicator 508 of the resolution of the next media asset in a plurality of related media assets may be generated for output. The quality of a media asset may be related to the resolution of the media asset, such that a media asset of a lower quality may have a lower when compared to a media asset that is not of a lower quality. In other examples, the quality of a media asset may be related to the bitrate of a media asset, such that a media asset of a lower quality may have a lower when compared to a media asset that is not of a lower quality. In some examples, the quality of a media asset may be related to a combination of the resolution and the bitrate of a media asset.

Figure 6:
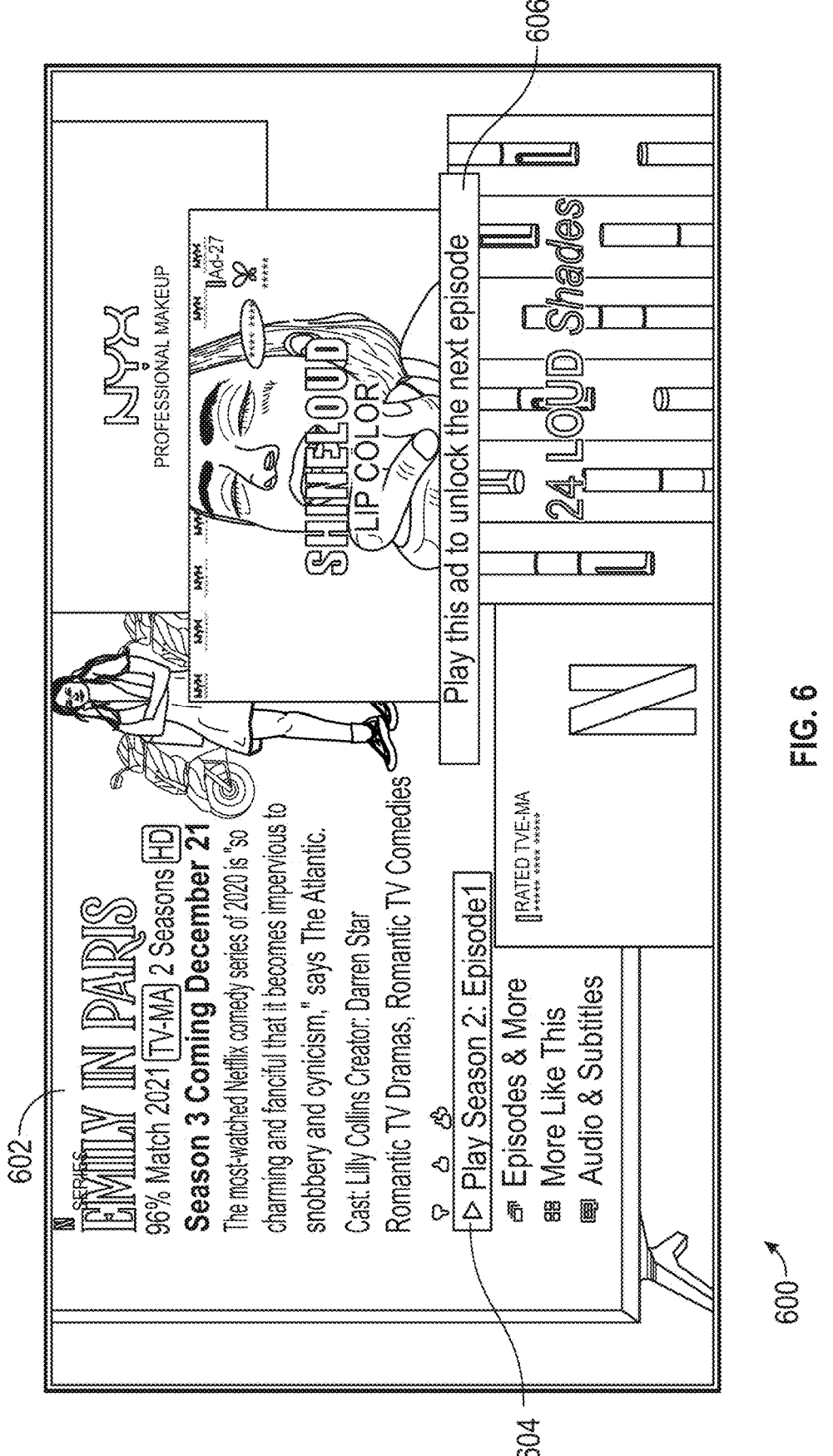
FIG. 6 shows another example user interface for managing the resources associated with streaming further media assets, in accordance with some embodiments of the disclosure.

FIG. 6 shows another example user interface for managing the resources associated with streaming further media assets, in accordance with some embodiments of the disclosure. The user interface 600 comprises a play icon 604 for selecting a media asset for playback, and a notification 606. In this example, if it is determined that the weighted consumption velocity is above a threshold consumption velocity, then a notification requesting playback of a media asset unrelated to the media asset selected for playback may be displayed. For example, the unrelated media asset may be a media asset that has a low resource value associated with it, for example, a relatively low-quality and/or short media asset. In this example, the unrelated media asset may be an advertisement, but in other examples, it may be a short media asset that may be of interest to a user as determined by, for example, a user profile.

In some examples, a dialog box indicating that a next media asset, such as an episode of a series, or content item, may be unlocked right away, if a sponsored advertisement is consumed. An advertisement inventory may be checked to search for an advertisement that provides a pre-roll (after a previous media asset, such as an episode) or post roll (prior to a next media asset, such as an episode) credits to unlock the next media asset.

Figure 7:
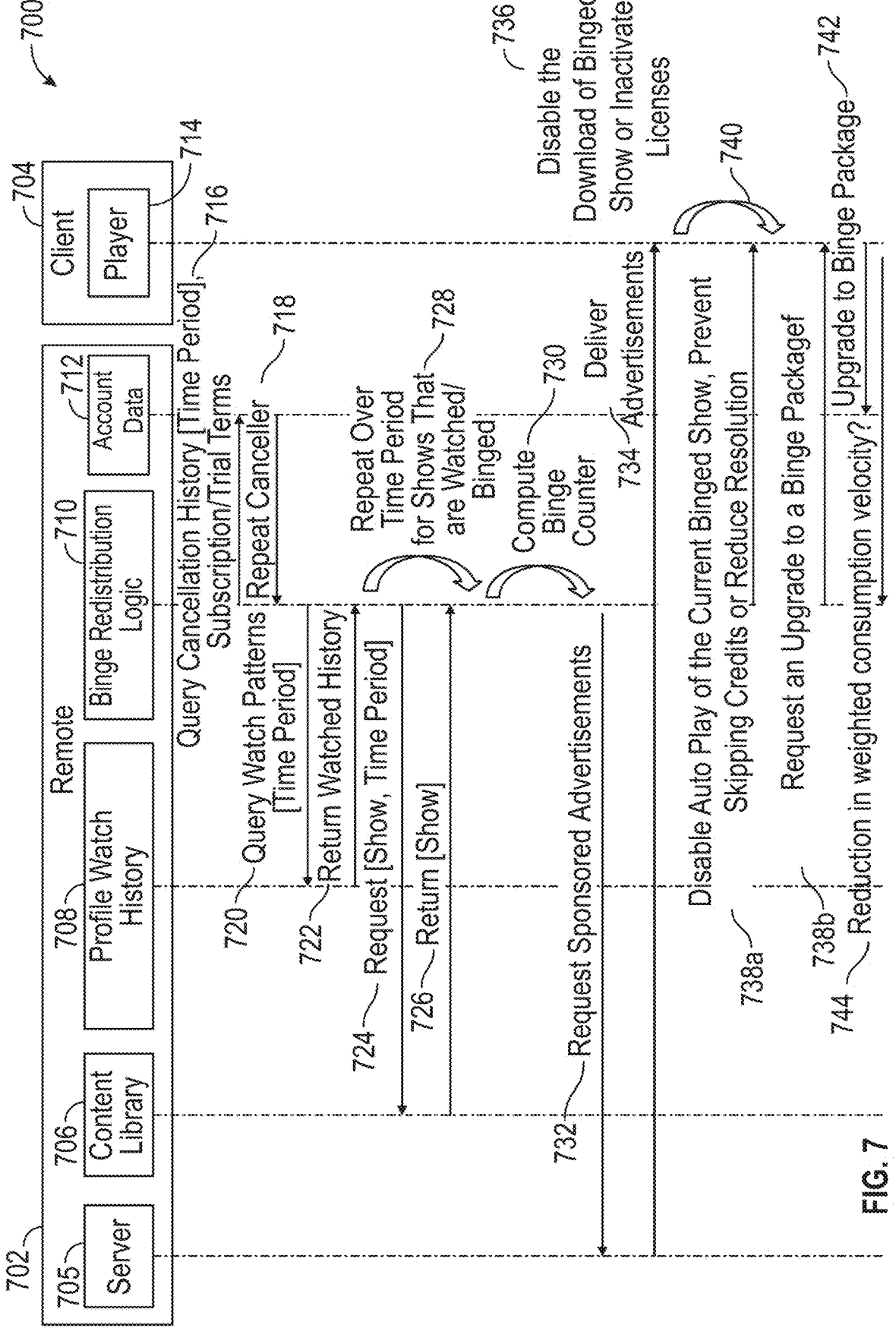
FIG. 7 shows a flowchart of illustrative steps for enabling an environment for utilizing historic user consumption of media assets to manage the resources associated with streaming further media assets, in accordance with some embodiments of the disclosure.

FIG. 7 shows a flowchart of illustrative steps for enabling an environment for utilizing historic user consumption of media assets to manage the resources associated with streaming further media assets, in accordance with some embodiments of the disclosure. Process 700 may be implemented, in whole or in part, on any of the aforementioned computing devices. In addition, one or more actions of the process 700 may be incorporated into or combined with one or more actions of any other process or embodiments described herein.

The flowchart comprises a remote component 702 and a client component 704. The remote component 702 comprises a server 705, a content library module 706, a profile watch history module 708, a binge redistribution logic module 710, and an account data module 712. The client component 704 comprises a media asset player 714. At 716, the binge redistribution logic module 710 transmits a query to the account data module 712 for a user history associated with a media asset service, such as an OTT platform. This query may include, for example, a cancellation history (including a time period since any previous cancellation), a subscription history and/or any trial terms associated with the service (i.e., did a user cancel as a trial period was coming to an end). The account data module 712, at 718, determines that a user is, for example, a repeat canceler. If the user is a repeat canceler, data representing this is transmitted to the binge redistribution logic module 710, then, at 720, the binge redistribution logic module 710 transmits a query to the profile watch history module 708 for watch patterns associated with a user profile over a time period. At 722, a watch history associated with a user profile is transmitted from the profile watch history module 708 to the binge redistribution logic module 710.

The binge redistribution logic module 710 transmits, at 724, a request to the content library module 706 for a media asset with a relatively low resource value. The content library module 706 transmits, at 726, data indicating a media asset with relatively low resource value to the binge redistribution logic module 710. Steps 722-726 may be repeated as represented at 728 for each plurality of related media assets that are indicated in a user profile as being consumed and/or binged by a user. At 730, a weighted consumption velocity, in this example, a binge counter, is computed. If the weighted consumption velocity is above a threshold consumption velocity, then an action may be identified in order to reduce the weighted consumption velocity. In this example, at 732, the binge redistribution logic module 710 transmits a request to the server 705 for a sponsored advertisement, or advertisements. At 734, the advertisement, or advertisements, are transmitted to the player 714 for generating for output. At 736, if it is determined that the weighted consumption velocity is above the threshold consumption velocity for a preset period of time, then a user logged in with that user profile may no longer be able to consume and/or download media assets until the weighted consumption velocity reduces below the threshold consumption velocity. This may be achieved by disabling the downloading of media assets/and or inactivating one or more licenses associated with the media assets. In other examples, at 738a, generation for automatic playback of a related media asset may be prevented and/or a media asset may be generated for play back in a reduced resolution. In another example, at 738b, a user may be presented with a user interface that enables them to upgrade to a higher package level at the service (such as an OTT platform), for example, a binge package. The player 714 may cycle 740 through the options 738. If a user upgrades to a higher package level, then, at 742, an indication is transmitted to the account data module 712, which processes the upgrade and associates it with the user profile and, at 744, the binge recommendation logic module 710 determines whether the weighted consumption velocity has reduced. In some examples, upgrading to a higher package level may reduce the weight in determining the consumption velocity (i.e., an upgrade to a higher package level may enable the consumption of more content).

Figure 8:
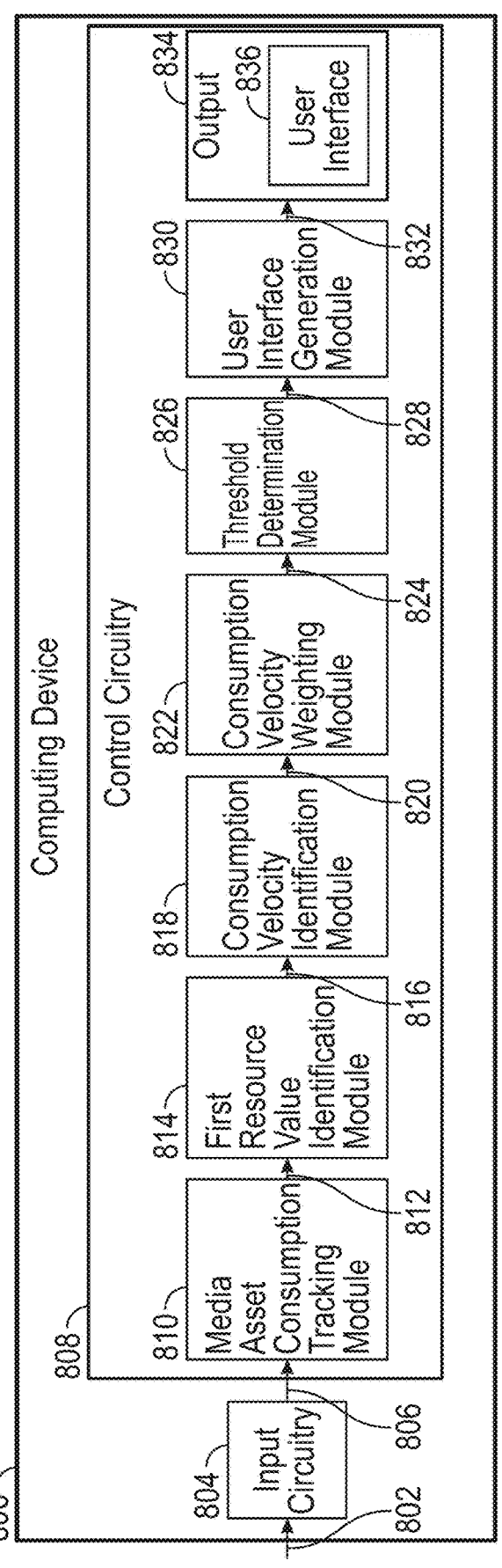
FIG. 8 shows a block diagram representing components of a computing device and dataflow therebetween for enabling an environment for utilizing historic user consumption of media assets to manage the resources associated with streaming further media assets, in accordance with some embodiments of the disclosure.

FIG. 8 shows a block diagram representing components of a computing device and dataflow therebetween for enabling an environment for utilizing historic user consumption of media assets to manage the resources associated with streaming further media assets, in accordance with some embodiments of the disclosure. Computing device 800 comprises input circuitry 804, control circuitry 808 and output circuitry 834. The computing device 800 may be, for example, a smart television. Control circuitry 808 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). The cores may be central processing unit cores, graphical processing unit cores and/or the cores of any suitable artificial intelligence accelerator. In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 802 by the input circuitry 804. The input circuitry 804 is configured to receive inputs related to a computing device. For example, this may be via an infrared controller, a Bluetooth and/or Wi-Fi controller of the computing device 800, a touchscreen, a keyboard, a mouse and/or a microphone. In another example, this may be via a gesture detected via an extended reality device. In a further example, the input may comprise instructions received via another computing device. The input circuitry 804 transmits 806 the user input to the control circuitry 808.

The control circuitry 808 comprises a media asset consumption tracking module 810, a first resource value identification module 814, a consumption velocity identification module 818, a consumption velocity weighting module 822, a threshold determination module 826, a user interface generation module 830 and an output module 834 comprising a user interface module 836. The input is transmitted to the media asset consumption tracking module 810, where a consumption of a plurality of media assets within a preset time period is tracked. An indication of the consumed plurality of media assets is transmitted 812 to the first resource value identification module 814, where a first resource value associated with the plurality of media assets is identified. An indication of the first resource value is transmitted 816 to the consumption velocity identification module 818, where a consumption velocity associated with the consumption of the plurality of media assets is identified. An indication of the first resource value and the consumption velocity is transmitted 820 to the consumption velocity weighting module 822, where the consumption velocity is weighted based on the first resource value. An indication of the weighted consumption velocity is transmitted 824 to the threshold determination module 826, where it is determined that the weighted consumption velocity is above a threshold consumption velocity. An indication of the determination is transmitted 828 to the user interface generation module 830, where a user interface element comprising a recommendation for a media asset, wherein a second resource value associated with the recommended media asset is lower than the first resource value, is generated for output. The generated user interface is transmitted 832 to the output module 834, where the user interface module 836 outputs the user interface.

Figure 9:
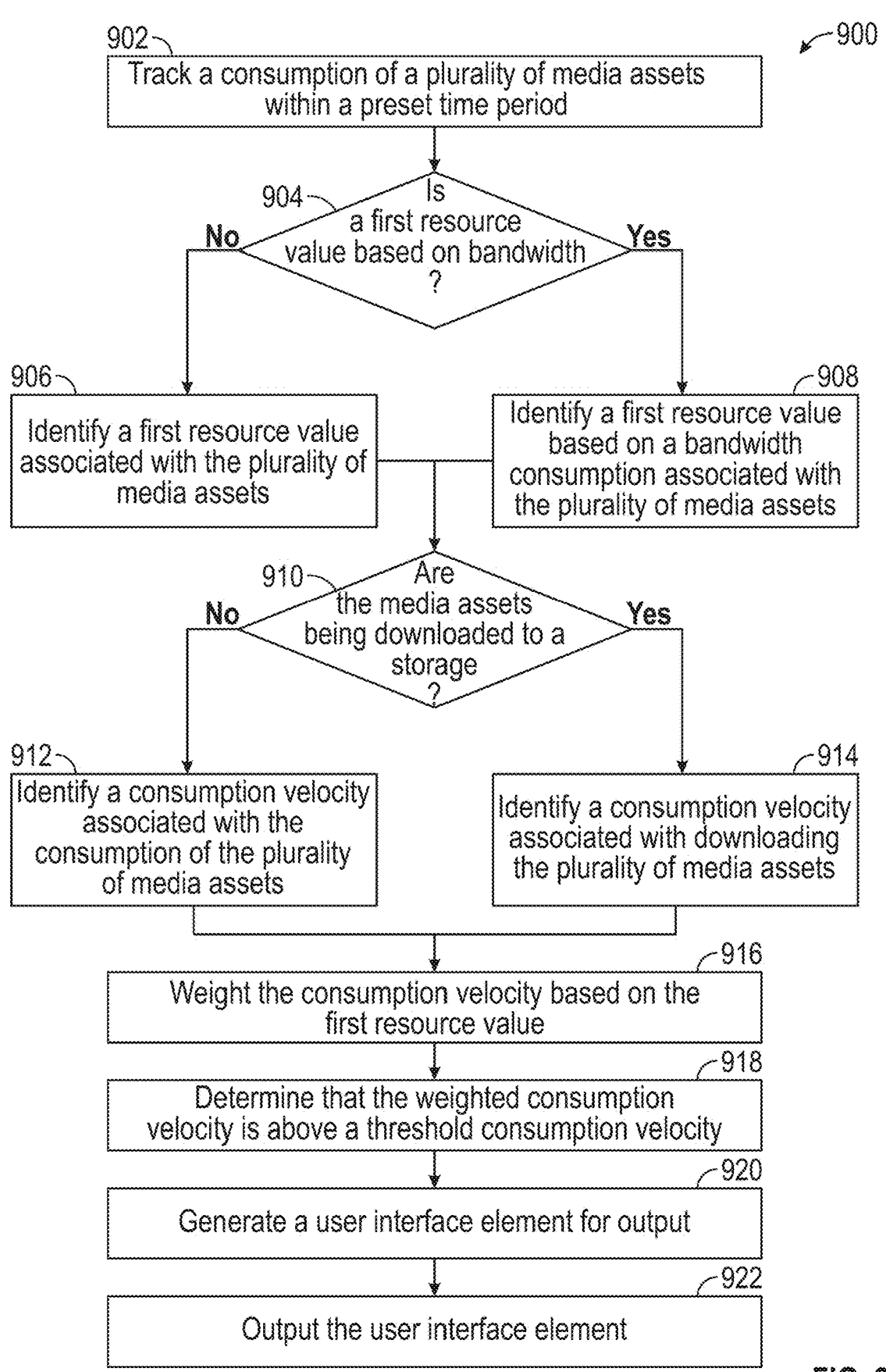
FIG. 9 shows another flowchart of illustrative steps for enabling an environment for utilizing historic user consumption of media assets to manage the resources associated with streaming further media assets, in accordance with some embodiments of the disclosure.

FIG. 9 shows another flowchart of illustrative steps for enabling an environment for utilizing historic user consumption of media assets to manage the resources associated with streaming further media assets, in accordance with some embodiments of the disclosure. Process 900 may be implemented, in whole or in part, on any of the aforementioned computing devices. In addition, one or more actions of the process 900 may be incorporated into or combined with one or more actions of any other process or embodiments described herein.

At 902, a consumption of a plurality of media assets within a preset time period is tracked. At 904, it is determined whether a first resource value is based on a bandwidth associated with consuming a media asset. For example, a first resource value based on a bandwidth associated with consuming a media asset may be based on the bandwidth consumption associated with delivering a media asset to a computing device via a network, such as the internet. In another example, a first resource value that is not based on a bandwidth associated with consuming a media asset may be based on a processing workload associated delivering the plurality of media assets to a computing device. If it is determined that the first resource value is not based on the bandwidth associated with consuming the media asset, then the process proceeds to step 906, where a first resource value associated with the plurality of media assets is identified. If, at 904, it is determined that the first resource value is based on the bandwidth associated with consuming the media asset, then the process proceeds to step 908, where a first resource value based on a bandwidth consumption associated with the plurality of media assets is identified. Both of steps 906 and 908 proceed to step 910, where it is determined whether the media assets are being downloaded to a storage, for example, of a computing device. If it is determined that the media assets are not being downloaded to a storage then the process proceeds to step 912, where a consumption velocity associated with the consumption of the plurality of media assets is identified. The consumption velocity associated with the consumption of the plurality of media assets is the rate at which media assets are consumed during a particular time period or bounded time window. For example, the rate at which a user streams a plurality of media assets to a computing device during a particular time period or bounded time window. If, at step 910, it is determined that the media assets are being downloaded to a storage of, for example, a computing device then the process proceeds to step 914, where a consumption velocity associated with downloading the plurality of media assets is identified. The consumption velocity associated with the downloading of the plurality of media assets is the rate at which media assets are downloaded during a particular time period or bounded time window. For example, the rate at which a user downloads a plurality of media assets to a computing device, for later viewing, during a particular time period or bounded time window. Both of steps 912 and 914 proceed to step 916, where the consumption velocity is weighted based on the first resource value. The process proceeds to step 918, where it is determined that the weighted consumption velocity is above a threshold consumption velocity. At 920, a user interface element comprising a recommendation for a media asset, wherein a second resource value associated with the recommended media asset is lower than the first resource value, is generated for output. At 922, the user interface element comprising the recommendation for the media asset is output.

FIGS. 10A-10B show flowcharts of illustrative steps for enabling an environment for utilizing historic user consumption of media assets to manage the resources associated with streaming further media assets, in accordance with some embodiments of the disclosure. Process 1000 may be implemented, in whole or in part, on any of the aforementioned computing devices. In addition, one or more actions of the process 1000 may be incorporated into or combined with one or more actions of any other process or embodiments described herein.

At 1002, the consumption of a plurality of media assets within a preset time period is tracked. At 1004, it is determined whether the plurality of media assets are related. If the plurality of media assets are not related, the process proceeds to step 1006, where the process ends. If the plurality of media assets are related, then the process proceeds to step 1008, where a first media asset that is related to the plurality of media assets is generated for output at the first computing device. At 1010, a first resource value associated with the plurality of media assets is identified, and at 1012, a consumption velocity associated with the consumption of the plurality of media assets is identified. At 1014, the consumption velocity is weighted based on the first resource value. At 1016, it is determined that the weighted consumption velocity is above a threshold consumption velocity.

At 1018, a response to the weighted consumption velocity being above the threshold consumption velocity is determined. The response proceeds to at least one of steps 1020, 1022, 1024, 1028 and/or 1032.

At 1020, generation, for automatic output, of a second media asset that is related to the consumed plurality of media assets is prevented. At 1022, a second media asset that is related to the consumed plurality of media assets at a lower quality than the first media asset is generated for output. At 1024, a time period is determined, and at 1026, the generation, for automatic output, of a second media asset that is related to the consumed plurality of media assets for the time period is prevented. At 1028, at least a portion of an unrelated second media asset is generated for output, and at 1030, a third media asset that is related to the consumed plurality of media assets is subsequently generated for output.

At 1032, the generation for output of a second media asset that is related to the consumed plurality of media assets is prevented, and at 1034, a notification that the second media asset is available to consume at a second computing device associated with the user profile is generated for output. At 1036, an input associated with the notification is received, and at 1038, it is determined whether the resolution of a display of the second computing device is lower than that of the first computing device. If, at 1038, it is determined that the resolution of a display of the second computing device is not lower than that of the first computing device, then, at 1040, the second media asset is generated for output at the second computing device. If, at 1038, it is determined that a resolution of a display of the second computing device is lower than that of the first computing device, then the process proceeds to 1042, where the second media asset is generated for output at a lower resolution.

FIG. 11 shows another flowchart of illustrative steps for enabling an environment for utilizing historic user consumption of media assets to manage the resources associated with streaming further media assets, in accordance with some embodiments of the disclosure. Process 1100 may be implemented, in whole or in part, on any of the aforementioned computing devices. In addition, one or more actions of the process 1100 may be incorporated into or combined with one or more actions of any other process or embodiments described herein.

At 1102, at a first computing device, a consumption of a first plurality of media assets within a preset time period is tracked, and at 1104, a first resource value associated with the first plurality of media assets is identified. At 1106, at a second computing device, a consumption of a second plurality of media assets, related to the first plurality of media assets, within a preset time period is tracked, and at 1108, a third resource value associated with the second plurality of media assets is identified. Both of steps 1104 and 1108 proceed to step 1110, where a group session is initiated. At 1112, a consumption velocity associated with the consumption of the first and second plurality of media assets is identified. At 1114, the consumption velocity is weighted based on the first and third resource values. At 1116, it is determined that the weighted consumption velocity is above a threshold consumption velocity. At 1118, a user interface element comprising a recommendation for a media asset with a second resource value that is lower than the first resource value is generated for output. At 1120, the user interface element at the first and second computing devices is generated for output.

In other examples, a large number of downloads immediately prior to a cancellation of service, such as a subscription to an OTT platform, may also be identified as a behavior of "binge watch and cancel." Here, the downloads may be content from a same episodic content series, a collection of highly recommended individual titles, and/or content that is exclusive to the OTT platform.

In another example, a binge redistribution algorithm may only be activated during the "Free Trial" period of a new account, for example, a subscription to an OTT platform. In a further example, binging activity associated with certain profiles, such as Kids' profiles, as computed by the binge counter, may be displayed for another profile (such as a parent profile) to control it as part of parental controls. Controls may be given, for example, to a master profile to limit the binging activity of another (secondary) profile.

Once an account is over a binge count threshold, the downloading of media assets, such as episodes, may be limited until the binge count goes down below the threshold. Alternatively, episode downloads may be enabled; however, license keys for such episodes may be set in a way such that they cannot be activated and played before a time that the binge counter is below the threshold and/or is reset.

When a user is detected as a heavy binger, a user interface associated with a service, such as an OTT platform, may offer to the user "healthier binging" routines such as a "Binge Break" feature. That may mean that the user has to take a break of, for example, 60 minutes before auto-playing the next episode during the same session. Implementation may leverage a sliding window mechanism such as increasing the break times as more and more media assets are being consumed during a single time period.

In an example, a platform, such as an OTT platform, may prevent skipping recap and/or credit portions of media assets for those accounts that were detected as being heavy bingers, based on computed binge counter values. In another example, once a binge session is detected at a computing device, unstoppable advertisement may be inserted into the binge session, for example into a media asset being generated for output at the computing device during the binge session. A binge score may be reduced such that it is reduced under a threshold level in response to the inserted advertisements being consumed at the computing device. In a further example, binge counter value computation and threshold values may be relaxed based on a time domain parameter for certain times of the year, such as those associated with festive and/or religious holidays. For example, it is expected that some users may consume more media assets during the holiday season (e.g., November and December) when compared to other parts of the year, such as summertime. OTT platforms may apply different weightings to time domain parameters based on the day, month, weekend and/or season, in addition to an account and/or profile time-based media asset consumption patterns. In another example, binge counter value computation and threshold values may be relaxed based on a combination of a genre and a time domain parameter. For example, a media asset with a "Christmas" genre being consumed in, for example. In further examples, any suitable factor may be taken into account such as, for example, the release of a new series of media assets.

In another example, if heavy binging activity is detected mainly happening on a first computing device, such as a smart television, depending on what other computing devices have been used historically on the account (e.g., are associated with an account user profile), binge redistribution may make the next media asset, such as an episode, available on a second computing device, such as a smartphone, that has different screen characteristics from the first computing device, and the media asset may be unavailable on the first computing device.

In another example, binge redistribution logic may multiply a computed binge counter with a coefficient, depending on a time left within a subscription period, or free trial timeframe, to a service, such as an OTT platform. As the subscription cycle, or free trial period, draws to a close, the coefficient may be exponentially increased to measure if the calculated binge counter is going over a threshold. Alternatively, as a new subscription period starts, the coefficient may be reduced below the normal level in order to provide more time for a user to consume further media assets. A platform owner may adjust this coefficient that impacts the binge counter based on, for example, other parameters related to transmission of the media assets, such as a caching location of the media asset (i.e., within a content distribution network), or a congestion response on a network and/or a cloud server.

In another example, if, or when, a profile associated with a service account, such as an account for an OTT platform, is detected to be participating in a watch party session, then the media asset, or assets, of the watch party may be identified, and the binge value may be queried. Then, normal computation of the binge counter may occur. This may prevent certain profiles trying to game the system and continue their binging activity during watch parties. The binge value for each participant of the watch party may be different, and the party media asset contribution to the binge counter computation may be different accordingly.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
tracking, at a computing device, a consumption of a plurality of media assets within a preset time period;
identifying a first resource value associated with the plurality of media assets;
identifying a consumption velocity associated with the consumption of the plurality of media assets;
weighting the consumption velocity based at least in part on the first resource value;
determining whether the weighted consumption velocity is above a threshold consumption velocity;
based at least in part on determining that the weighted consumption velocity is above the threshold consumption velocity, determining a recommended media asset with a second resource value that is lower than the first resource value; and
generating, for output, a user interface element comprising a recommendation for the recommended media asset.

2. The method of claim 1, wherein the first resource value is based on at least one of bandwidth consumption or storage usage associated with the plurality of media assets.

3. The method of claim 1, wherein the consumed plurality of media assets are related, and the method further comprises:
generating for output a first media asset that is related to the consumed plurality of media assets; and
in response to the determining that the weighted consumption velocity is above a threshold consumption velocity, preventing the automatic output of a second media asset that is related to the consumed plurality of media assets.

4. The method of claim 1, wherein the consumed plurality of media assets are related, and the method further comprises:
generating for output, at a first quality, a first media asset that is related to the consumed plurality of media assets; and
in response to the determining that the weighted consumption velocity is above a threshold consumption velocity, generating for output, at a second quality lower than the first quality, a second media asset that is related to the consumed plurality of assets.

5. The method of claim 1, wherein the consumed plurality of media assets are related, and the method further comprises:
generate for output a first media asset that is related to the consumed plurality of media assets; and
in response to the determining that the weighted consumption velocity is above a threshold consumption velocity:
determining a time period, wherein the time period is determined in order to reduce the weighted consumption velocity below the threshold consumption velocity; and
generating, for automatic output after the time period, a second media asset that is related to the consumed plurality of media assets.

6. The method of claim 1, wherein the consumed plurality of media assets are related, and the method further comprises:
generating for output a first media asset that is related to the consumed plurality of media assets; and
in response to the determining that the weighted consumption velocity is above a threshold consumption velocity:
generating for output at least a portion of a second media asset that is unrelated to the consumed plurality of media assets; and
subsequent to the generating for output the at least a portion of the second media asset, generating for output a third media asset that is related to the consumed plurality of media assets.

7. The method of claim 1, wherein the computing device is a first computing device, the consumed plurality of media assets are related, and the method further comprises:
outputting, at the first computing device, a first media asset that is related to the consumed plurality of media assets; and
in response to the determining that the weighted consumption velocity is above a threshold consumption velocity:
preventing output, at the first computing device, of a second media asset that is related to the consumed plurality of media assets;
generating for output a notification, at the first computing device, that the second media asset is available to consume at a second computing device associated with the user profile;
receiving an input associated with the notification; and
generating for output, at the second computing device, the second media asset.

8. The method of claim 7, wherein a first resolution of a first display associated with the first computing device is higher than a second resolution of a second display associated with the second computing device.

9. The method of claim 1, wherein the identifying the consumption velocity associated with the consumption of the plurality of media assets further comprises identifying the consumption velocity associated with downloading the plurality of media assets to a storage associated with the computing device.

10. The method of claim 1, wherein the computing device is a first computing device, the plurality of media assets is a first plurality of media assets, and the preset time period is a first preset time period, and the method further comprises:

tracking, at a second computing device, a consumption of a second plurality of media assets within a second preset time period, wherein the first plurality and the second plurality of media assets are related;

identifying a third resource value associated with the second plurality of media assets;

initiating, between the first computing device and the second computing device, a group session for consuming a media asset that is related to the first and second plurality of media assets;

identifying the consumption velocity associated with the consumption of the plurality of media assets further comprises identifying a consumption velocity associated with the consumption of the first plurality of media assets and the second plurality of media assets; and weighting the consumption velocity further comprises weighting the consumption value based on the first resource value and the third resource value.

11. A system comprising:

input/output circuitry configured to:

receive an input associated with tracking, at a computing device, a consumption of a plurality of media assets within a preset time period; and processing circuitry configured to:

identify a first resource value associated with the plurality of media assets;

identify a consumption velocity associated with the consumption of the plurality of media assets;

weight the consumption velocity based at least in part on the first resource value;

determine whether the weighted consumption velocity is above a threshold consumption velocity;

based at least in part on determining that the weighted consumption velocity is above the threshold consumption velocity, determine a recommended media asset with a second resource value that is lower than the first resource value; and generate, for output, a user interface element comprising a recommendation for the recommended media asset.

12. The system of claim 11, wherein the first resource value is based on at least one of bandwidth consumption or storage usage associated with the plurality of media assets.

13. The system of claim 11, wherein the consumed plurality of media assets are related and the processing circuitry is further configured to:

generate for output a first media asset that is related to the consumed plurality of media assets; and in response to the determining that the weighted consumption velocity is above a threshold consumption velocity, prevent the automatic output of a second media asset that is related to the consumed plurality of media assets.

14. The system of claim 11, wherein the consumed plurality of media assets are related and the processing circuitry is further configured to:

generate for output, at a first quality, a first media asset that is related to the consumed plurality of media assets; and in response to the determining that the weighted consumption velocity is above a threshold consumption velocity, generate for output, at a second quality lower than the first quality, a second media asset that is related to the consumed plurality of assets.

15. The system of claim 11, wherein the consumed plurality of media assets are related and the processing circuitry is further configured to:

generate for output a first media asset that is related to the consumed plurality of media assets; and in response to the determining that the weighted consumption velocity is above a threshold consumption velocity:

determine a time period, wherein the time period is determined in order to reduce the weighted consumption velocity below the threshold consumption velocity; and generate, for automatic output after the time period, a second media asset that is related to the consumed plurality of media assets.

16. The system of claim 11, wherein the consumed plurality of media assets are related and the processing circuitry is further configured to:

generate for output a first media asset that is related to the consumed plurality of media assets; and in response to the determining that the weighted consumption velocity is above a threshold consumption velocity:

generate for output at least a portion of a second media asset that is unrelated to the consumed plurality of media assets; and subsequent to the generating for output the at least a portion of the second media asset, generating for output a third media asset that is related to the consumed plurality of media assets.

17. The system of claim 11, wherein the computing device is a first computing device, the consumed plurality of media assets are related and the processing circuitry is further configured to:

output, at the first computing device, a first media asset that is related to the consumed plurality of media assets; and in response to the determining that the weighted consumption velocity is above a threshold consumption velocity:

prevent output, at the first computing device, of a second media asset that is related to the consumed plurality of media assets;

generate for output a notification, at the first computing device, that the second media asset is available to consume at a second computing device associated with the user profile;

receive an input associated with the notification; and generate for output, at the second computing device, the second media asset.

18. The system of claim 17, wherein a first resolution of a first display associated with the first computing device is higher than a second resolution of a second display associated with the second computing device.

19. The system of claim 11, wherein the processing circuitry configured to identify the consumption velocity associated with the consumption of the plurality of media assets is further configured to identify the consumption velocity associated with downloading the plurality of media assets to a storage associated with the computing device.

20. The system of claim 11, wherein the computing device is a first computing device, the plurality of media assets is a first plurality of media assets, and the preset time period is a first preset time period, and the processing circuitry is further configured to:

track, at a second computing device, a consumption of a second plurality of media assets within a second preset time period, wherein the first plurality and the second plurality of media assets are related;

identify a third resource value associated with the second plurality of media assets;

initiate, between the first computing device and the second computing device, a group session for consuming a media asset that is related to the first and second plurality of media assets;

identify the consumption velocity associated with the consumption of the plurality of media assets further comprises identifying a consumption velocity associated with the consumption of the first plurality of media assets and the second plurality of media assets; and weight the consumption velocity further comprises weighting the consumption value based on the first resource value and the third resource value.

* * * * *